Figure 1:
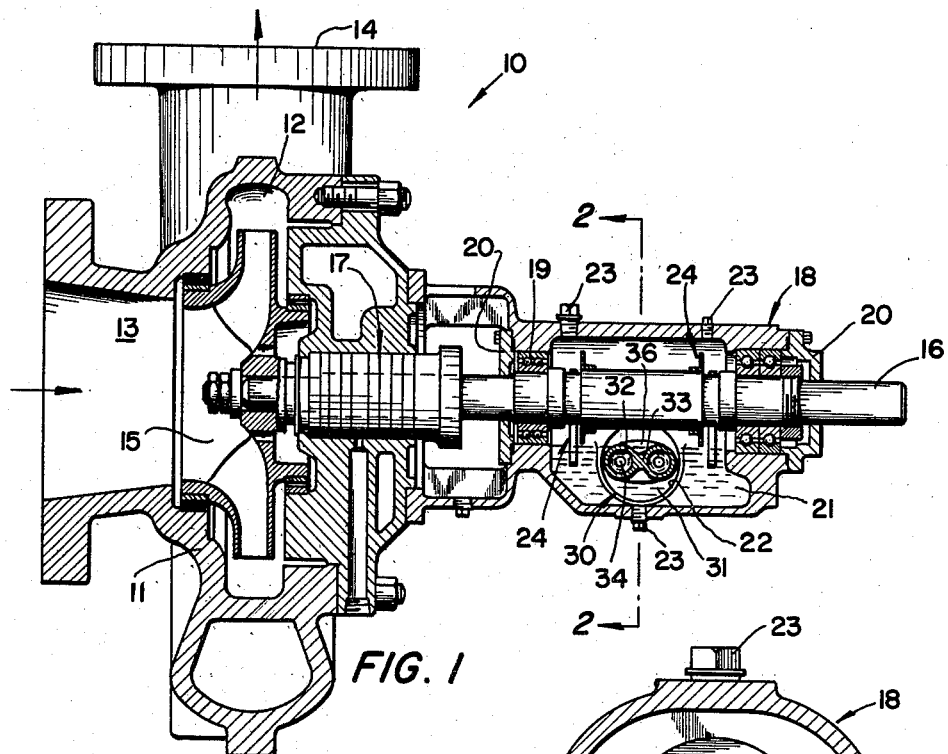

April 27, 1965

R. W. ARNTS ETAL 3,180,270

PUMP WITH BEARING LUBRICATING AND COOLING MEANS

Filed Jan. 10, 1964

INVENTORS
WILLIAM R. HAYES
ROBERT W. ARNTS
BY Charles J. Worth
AGENT

United States Patent Office 3,180,270
Patented Apr. 27, 1965

3,180,270
PUMP WITH BEARING LUBRICATING
AND COOLING MEANS
Robert W. Arnts, Easton, Pa., and William R. Hayes, Overland Park, Kans., assignors to Ingersoll-Rand Company, New York, N.Y., a corporation of New Jersey
Filed Jan. 10, 1964, Ser. No. 336,946
9 Claims. (Cl. 103—111)

This invention relates generally to pumps and more particularly to pumps with cooling means for high temperature operation.

Pumps of the type considered provide out-board bearings rotatably supporting a shaft which passes through packing or mechanical seal in the pump housing, and mounts an impeller at its end. The bearings are mounted in a bearing housing which maintains a lubricant supply for the bearings. It is common practice to provide a cored passage in the bearing housing which encircles the bearings and underlies a lubricant sump area for providing the necessary heat transfer to prevent overheating of the lubricant and bearings. It has been found that arrangements are attended by insufficient cooling of the lubricant and excessive temperature differential across the bearings. This often results in accelerated bearing and bearing housing failure.

Accordingly, an object of the present invention is to provide a pump with a shaft rotatably carried by bearings mounted in a housing storing a supply of bearing lubricant which is sufficiently cooled by immersion type heat transfer means to prevent overheating of the bearings and lubricant.

Another object of the present invention is to provide the foregoing pump and heat transfer means which may be separated from one another without draining the coolant system.

Still another object of the present invention is to provide the foregoing pump and heat transfer means wherein the pump bearing housing is constructed of material primarily for support and the heat transfer means is constructed of material having good heat transfer characteristics.

The present invention contemplates a pump having a casing providing a pump chamber with an inlet and outlet therefor, a rotatable shaft extending through the housing, and an impeller mounted on the end of the shaft in the chamber; a housing connected to the casing providing a reservoir for lubricant; bearing means mounted in the housing rotatably supporting the shaft; means mounted on the shaft adjacent the bearing means to remove lubricant from the reservoir and to apply removed lubricant to the bearing means and to the adjacent shaft and housing structure for lubricating and cooling the bearing means; and a heat transfer cartridge connected to the housing being disposed in the reservoir providing a flow path for coolant fluid to lower the temperature of lubricant in the reservoir for such cooling.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 3:
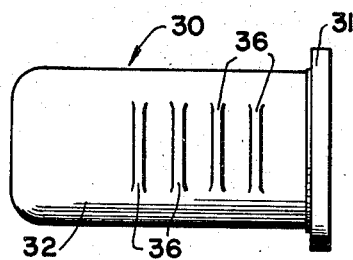
Figure 2:
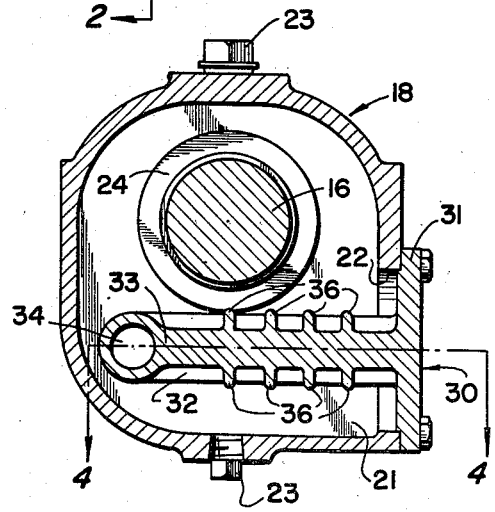
Figure 4:
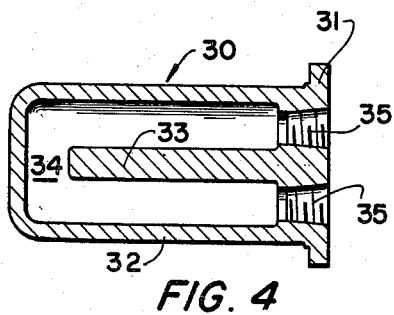

FIGURE 1 is a sectional view of a typical pump with cooling means made in accordance with the present invention, FIGURE 2 is an enlarged sectional view taken on line 2—2 of FIGURE 1, FIGURE 3 is a plan view of the novel cooling cartridge, and FIGURE 4 is a sectional view of the cooling cartridge taken on line 4—4 of FIGURE 2.

Referring now to the drawings, and particularly to FIGURE 1, a pump 10 has a housing or casing 11 providing a pump chamber 12 therein with an inlet 13 adapted to receive fluid to be propelled and an outlet 14 for such fluid. An impeller 15 is disposed in pump chamber 12 and is mounted on the end of a shaft 16 which extends through packing or mechanical seal 17 in the housing 11 to prevent leakage of fluid being pumped, from the chamber 12 along the shaft.

A pump bearing housing or housing portion 18 is connected to the pump housing 11 and mounts spaced axially alined bearings 19 which rotatably carry and support shaft 16. A seal 20 is provided at the outer face of each bearing 19 to prevent leakage of lubricant therethrough. The bearing housing 18 is shell-like or hollow and provides a sump or reservoir area 21 between the bearings 19 for bearing lubricant. The sump or reservoir 21 is provided with the usual plugged filler and drain means 23.

A pair of spaced slinger or splasher ring assemblies 24 are mounted on shaft 16 each adjacent inwardly of a bearing 19 to splash lubricant stored in the reservoir 21 onto the bearings and the adjacent areas of the shaft and bearing housing 18. In addition to lubrication, the lubricant cools bearings 19, and the shaft structure 16 and housing structure 18 adjacent to the bearings without creating a temperature differential between the various parts. Accordingly, the temperature of the lubricant must be sufficiently low to derive such temperature reduction.

To accomplish such temperature reduction, bearing housing 18 has an opening therethrough. As shown in FIGURES 1 and 2, a cooling cartridge or an immersion type heat transfer unit 30, connected to a fluid coolant circulating system (not shown), is inserted through opening 22 and is disposed in the lubricant in sump or reservoir 21.

The cartridge 30 has a flange 31 that is sealingly connected to bearing housing 18 for mounting, and an elongated thin walled body portion 32 that extends axially into the sump 21 transverse to the axis of rotation of shaft 16. Cartridge 30 is cored, having a central wall 33 extending axially from its flanged end and terminating short of its opposite end, to provide a U-shaped flow passage 34. Both ends 35 of flow passage 34 are open at the flange end of cartridge 30 and are threaded, or otherwise adapted to be connected to a fluid coolant circulating system (not shown).

Cartridge 30 is made of a material with good heat transfer characteristics and is not restricted to the material of the bearing housing 18. Body portion 32 forms a thin wall around passage 34 and has a plurality of spaced outwardly extending fins 36 forming part of its upper and lower outer surfaces to increase its heat transfer capabilities. For greatest efficiency, body portion 32 should be immersed to subject a maximum of its heat transfer surface to contact by the lubricant. Thus total cooling of bearings 19, and adjacent shaft structure 16 and bearing housing structure 18 is accomplished by the cooled lubricant.

In case of failure of any part of the pump 10 or the coolant circulating system (not shown) including cartridge 30, the sump 21 is first drained. The cartridge 30 is then disconnected and removed from bearing housing 18. Where pump failure has occurred, pump 10 may be removed and replaced or repaired with no disturbance to the cooling system. Similarly, the pump may remain undisturbed when cooling system failure occurs.

It should now be readily understood that, in accordance with the present invention, a pump is provided with out-board bearings, mounted in a bearing housing, for rotatably mounting the pump shaft. The bearing housing provides a reservoir for bearing lubricant that is cooled by an immersible type heat transfer unit separable therefrom for repair or replacement of a failed pump or cooling system without disturbance to the other. The total cooling effect is derived solely from the cooled lubricant to derive even temperature reduction of the bearings and the adjacent structure.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. In a pump having a casing providing a pump chamber, with an inlet and outlet therefor, a rotatable shaft extending through the housing, and an impeller mounted on the end of the shaft in the chamber;
   (a) a housing connected to the casing providing a reservoir for lubricant;
   (b) bearing means mounted in the housing rotatably supporting the shaft; which extends therethrough
   (c) means mounted on the shaft adjacent the bearing means to remove lubricant from the reservoir and to apply removed lubricant to the bearing means and to the adjacent shaft and housing structure for lubricating and cooling the bearing means; and
   (d) a heat transfer cartridge connected to the housing being disposed transverse to the shaft in the reservoir providing a flow path for coolant fluid to lower the temperature of lubricant in the reservoir for such cooling.

2. In a pump having a casing providing a pump chamber with an inlet and outlet therefor, a rotatable shaft extending through the housing, and an impeller mounted on the end of the shaft in the chamber;
   (a) a housing connected to the casing providing a reservoir for lubricant;
   (b) bearing means mounted in the housing rotatably supporting the shaft; which extends therethrough
   (c) means mounted on the shaft adjacent the bearing means to remove lubricant from the reservoir and to apply removed lubricant to the housing means and to the adjacent shaft and housing structure for lubricating and cooling the bearing means;
   (d) an immersible heat transfer cartridge having an elongated body portion extending through the housing transverse to the shaft into the reservoir and a flange at one end of the body portion connected to the body portion; and
   (e) the cartridge having a passage therein with an inlet and outlet at the flange end thereof providing a flow path for coolant fluid to lower the temperature of lubricant in the reservoir for such cooling.

3. In a pump having a casing providing a pump chamber with an inlet and outlet therefor, a rotatable shaft extending through the housing, and an impeller mounted on the end of the shaft in the chamber;
   (a) a housing connected to the casing providing a reservoir for lubricant;
   (b) bearing means mounted in the housing rotatably supporting the shaft; which extends therethrough
   (c) means mounted on the shaft adjacent the bearing means to remove lubricant from the reservoir and to apply removed lubricant to the bearing means and to the adjacent shaft and housing structure for lubricating and cooling the bearing means;
   (d) an immersible heat transfer cartridge having an elongated body portion extending through the housing into the reservoir and a flange at one end of the body portion connected to the body portion;
   (e) the cartridge having a pair of adjacent bores each connected at one end to the adjacent end of the other providing a flow path for coolant fluid to lower the temperature of lubricant in the reservoir for such cooling and being open at the flange end providing an inlet and outlet for the flow path; and
   (f) the body portion having a pair of opposite walls each including a plurality of spaced fins extending outwardly from both bores to increase the heat transfer surface of the cartridge subject to contact by lubricant in the reservoir.

4. In a pump having a casing providing a pump chamber with an inlet and outlet therefor, a rotatable shaft extending through the housing, and an impeller mounted on the end of the shaft in the chamber;
   (a) a housing connected to the casing providing a reservoir for lubricant;
   (b) a pair of bearings mounted in spaced relation with one another in the housing rotatably supporting the shaft;
   (c) means mounted on the shaft between the bearings to remove lubricant from the reservoir and to apply removed lubricant to the bearings and to the adjacent shaft and housing structure for lubricating and cooling the bearings; and
   (d) a heat transfer cartridge connected to the housing being disposed in the reservoir between the bearings providing a flow path for coolant fluid to lower the temperature of lubricant in the reservoir for such cooling.

5. In a pump having a casing providing a pump chamber with an inlet and outlet therefor, a rotatable shaft extending through the housing, and an impeller mounted on the end of the shaft in the chamber;
   (a) a housing connected to the casing providing a reservoir for lubricant;
   (b) a pair of bearings mounted in spaced relation with one another in the housing rotatably supporting the shaft;
   (c) means mounted on the shaft between the bearings to remove lubricant from the reservoir and to apply removed lubricant to the bearings and to the adjacent shaft and housing structure for lubricating and cooling the bearings;
   (d) an immersible heat transfer cartridge having an elongated body portion extending through the housing into the reservoir between the bearings and a flange at one end of the body portion connected to the body portion; and
   (e) the cartridge having a passage therein with an inlet and outlet at the flange end thereof providing a flow path for coolant fluid to lower the temperature of lubricant in the reservoir for such cooling.

6. In a pump having a casing providing a pump chamber with an inlet and outlet therefor, a rotatable shaft extending through the housing, and an impeller mounted on the end of the shaft in the chamber;
   (a) a housing connected to the casing providing a reservoir for lubricant;
   (b) a pair of bearings mounted in spaced relation with one another in the housing rotatably supporting the shaft;
   (c) means mounted on the shaft between the bearings to remove lubricant from the reservoir and to apply removed lubricant to the bearings and to the adjacent shaft and housing structure for lubricating and cooling the bearings;
   (d) an immersible heat transfer cartridge having an elongated body portion extending through the housing into the reservoir between the bearings and a flange at one end of the body portion connected to the body portion;
   (e) the cartridge having a pair of adjacent bores each connected at one end to the adjacent end of the other providing a flow path for coolant fluid to lower the temperature of lubricant in the reservoir for such cooling and being open at the flange end providing an inlet and outlet for the flow path; and (f) the body portion having a pair of opposite walls each including a plurality of spaced fins extending outwardly from both bores to increase the heat transfer surface of the cartridge subject to contact by lubricant in the reservoir.

7. In a pump having a casing providing a pump chamber with an inlet and outlet therefor, a rotatable shaft extending through the housing, and an impeller mounted on the end of the shaft in the chamber;

(a) a housing connected at one end to the casing providing a reservoir for lubricant;

(b) a pair of axially alined bearings each mounted in one end of the housing spaced from the other rotatably supporting the shaft;

(c) slinger rings mounted on the shaft between the bearings to remove lubricant from the reservoir and to apply removed lubricant to the bearings and to the adjacent shaft structure and housing ends for lubricating and cooling the bearings; and (d) a heat transfer cartridge connected to the housing being disposed in the reservoir between the rings providing a flow path for coolant fluid to lower the temperature of lubricant in the reservoir for such cooling.

8. In a pump having a casing providing a pump chamber with an inlet and outlet therefor, a rotatable shaft extending through the housing, and an impeller mounted on the end of the shaft in the chamber;

(a) a housing connected at one end to the casing providing a reservoir for lubricant;

(b) a pair of axially alined bearings each mounted in one end of the housing spaced from the other rotatably supporting the shaft;

(c) slinger rings mounted on the shaft between the bearings to remove lubricant from the reservoir and to apply removed lubricant to the bearings and to the adjacent shaft structure and housing ends for lubricating and cooling the bearings;

(d) an immersible heat transfer cartridge having an elongated body portion extending through the housing into the reservoir between the rings and a flange at one end of the body portion connected to the body portion; and (e) the cartridge having a passage therein with an inlet and outlet at the flange end thereof providing a flow path for coolant fluid to lower the temperature of lubricant in the reservoir for such cooling.

9. In a pump having a casing providing a pump chamber with an inlet and outlet therefor, a rotatable shaft extending through the housing, and an impeller mounted on the end of the shaft in the chamber;

(a) a housing connected at one end to the casing providing a reservoir for lubricant;

(b) a pair of axially alined bearings each mounted in one end of the housing spaced from the other rotatably supporting the shaft;

(c) slinger rings mounted on the shaft between the bearings to remove lubricant from the reservoir and to apply removed lubricant to the bearings and to the adjacent shaft structure and housing ends for lubricating and cooling the bearings;

(d) an immersible heat transfer cartridge having an elongated body portion extending through the housing into the reservoir between the rings and a flange at one end of the body portion connected to the body portion;

(e) the cartridge having a pair of adjacent bores each connected at one end to the adjacent end of the other providing a flow path for coolant fluid to lower the temperature of lubricant in the reservoir for such cooling and being open at the flange end providing an inlet and outlet for the flow path; and (f) the body portion having a pair of opposite walls each including a plurality of spaced fins extending outwardly from both bores to increase the heat transfer surface of the cartridge subject to contact by lubricant in the reservoir.

References Cited by the Examiner
UNITED STATES PATENTS

| 1,808,792 | 6/31 | Schellens | 308—128 |
| 2,350,976 | 6/44 | Worn | 165—181 |
| 3,098,683 | 7/63 | Jernberg | 308—128 |

FOREIGN PATENTS 74,778 9/17 Switzerland.

LAURENCE V. EFNER, *Primary Examiner.*

ROBERT M. WALKER, *Examiner.*